(12) United States Patent
Wymore (10) Patent No.: US 10,259,413 B2
(45) Date of Patent: Apr. 16, 2019

(54) VEHICULAR PUSH BUMPER LIGHT ASSEMBLY

(71) Applicant: Iddea California, LLC, Brea, CA (US)

(72) Inventor: Timothy J. Wymore, Yorba Linda, CA (US)

(73) Assignee: Iddea California, LLC, Brea, CA (US)

( * ) Notice: Subject to any disclaimer, the term of this patent is extended or adjusted under 35 U.S.C. 154(b) by 0 days.

(21) Appl. No.: 15/804,685

(22) Filed: Nov. 6, 2017

(65) Prior Publication Data

US 2018/0118142 A1    May 3, 2018

Related U.S. Application Data

(63) Continuation of application No. 15/337,467, filed on Oct. 28, 2016, now Pat. No. 9,840,218.

(51) Int. Cl.
*B60R 19/24*    (2006.01)
*B60R 19/50*    (2006.01)

(52) U.S. Cl.
CPC .............. *B60R 19/50* (2013.01); *B60R 19/24* (2013.01); *B60R 2019/505* (2013.01)

(58) Field of Classification Search
CPC ......... B60R 19/44; B60R 19/50; B60R 19/52; B60R 19/24; B60R 2019/505; B60R 2019/522; B60R 2019/525; B60R 2019/527; B60Q 1/0005; B60Q 1/0483; B60Q 1/0491; B60Q 1/2661; B60Q 1/2696
USPC .......................... 296/102, 115, 117, 142–144
See application file for complete search history.

(56) References Cited

U.S. PATENT DOCUMENTS

| | | | |
|---|---|---|---|
| 4,671,552 A | 6/1987 | Anderson | |
| 5,695,228 A | 12/1997 | Storer | |
| 5,833,283 A | 11/1998 | Shaw | |
| 6,113,164 A | 9/2000 | Setina | |
| 6,231,093 B1 | 5/2001 | Storer | |
| 6,318,773 B2 | 11/2001 | Storer | |
| 6,325,430 B1 | 12/2001 | King | |
| 6,612,595 B1 | 9/2003 | Storer | |
| D551,138 S | 9/2007 | Storer et al. | |
| D572,180 S | 7/2008 | Storer | |
| D577,319 S | 9/2008 | Storer | |
| 7,823,938 B2 | 11/2010 | McKee | |
| 8,204,254 B2 | 6/2012 | Shannon | |
| 8,585,107 B2 | 11/2013 | Kekich, Jr. et al. | |
| 9,108,581 B2 | 8/2015 | Perez | |
| 9,499,095 B1 | 11/2016 | Buehler | |
| 9,840,218 B1 * | 12/2017 | Wymore | ................. B60R 19/50 |
| 2010/0096865 A1 | 4/2010 | McKee | |

(Continued)

*Primary Examiner* — Gregory A Blankenship
(74) *Attorney, Agent, or Firm* — Stetina Brunda Garred and Brucker (57) ABSTRACT

A vehicular push bumper light assembly includes a frame, a frame tube coupled to the frame, a frame tube opening, and a light plate cover affixed over the frame tube opening. The light plate cover includes one or more light plate cover openings. The vehicular push bumper light assembly also includes one or more light plate assemblies. Each light plate assembly includes at least two light elements that are disposable through a corresponding light plate cover opening. The first light element may be disposed through the first light plate cover opening and the second light element may be disposed through the second light plate cover opening.

18 Claims, 5 Drawing Sheets

(56) References Cited

U.S. PATENT DOCUMENTS

2013/0049384 A1    2/2013   Kekich, Jr.
2015/0021937 A1    1/2015   Perez \* cited by examiner

VEHICULAR PUSH BUMPER LIGHT ASSEMBLY

CROSS-REFERENCE TO RELATED APPLICATIONS

The present application is a continuation patent application of U.S. patent application Ser. No. 15/337,467 filed on Oct. 28, 2016, the entire contents of which are incorporated herein by reference.

STATEMENT RE: FEDERALLY SPONSORED RESEARCH/DEVELOPMENT

Not Applicable

BACKGROUND

Technical Field

The present disclosure relates to lighting systems for vehicles. More particularly, the present disclosure relates to a vehicular push bumper light assembly.

Discussion of Related Art

An accessory often used by police vehicles is a "push bumper" or nudge bar. The "push bumper" is typically mounted to the front chassis of the police car and is position on or anterior to the front bumper and grille. A push bumper is intended to augment the front bumper and enable the vehicle to be used as a battering ram on various structures and objects, or to assist in the pushing of disabled vehicles out of the way. A push bumper may also assist law enforcement attempting to spin or slow down a fleeing vehicle.

Often there is a need to further illuminate the area in front of the push bumper of a police vehicle with warning signal lights in order to enable law enforcement officers to determine whether and how they should use a push bumper on an object in front of them, to signal to other vehicles their presence and the emergent nature of their movements. This is especially the case when police are required to operate under reduced light conditions and are traveling at high speed or in areas of high traffic. The various law enforcement agencies at the city, county, state, and federal level may have divergent regulations for compliance with warning signal lighting requirements.

Accordingly, a need exists for an improved lighting system for police cars, trucks, SUV's and other vehicles that provides warning signal illumination in front of a push bumper.

BRIEF SUMMARY

According to an aspect of the present disclosure, a vehicular push bumper light assembly mountable to a vehicle includes an H-frame disposable over a front bumper and coupled to a front chassis of the vehicle. A frame tube is coupled to the H-frame. The frame tube has a frame tube opening facing the front of the vehicle. A light plate cover is disposably affixable over the frame tube opening. The light plate cover includes a first face facing the front of a vehicle and an opposing second face. The light plate cover further includes at least a first light plate cover opening and a second light plate cover opening. One or more light plate assemblies are coupled to the light plate cover. Each light plate assembly includes at least two light elements that are disposable through the light plate cover. The first light element may be disposed through the first light plate cover opening and the second light element may be disposed through the second light plate cover opening.

In one embodiment of the present disclosure, the light elements are a light-emitting diode (LED).

According to another aspect of the present disclosure, the vehicular push bumper light assembly includes one or more formed brackets mountable to the light plate cover. The first formed bracket may have at least two openings with a first formed bracket opening being disposably aligned with the first light plate cover opening. A second formed bracket opening may be disposably aligned with the second light plate cover opening. The light plate assembly may further include a first key bracket proximate to the first light element and coupled with the first formed bracket in order to secure the first light element through the first formed bracket opening and the first light plate cover opening. A second bracket proximate the second light element may be coupled with the first formed bracket in order to secure the second light element through the second formed bracket opening and the second light plate cover opening.

In a further embodiment of the present disclosure, the first formed bracket includes a first longitudinal end and an opposing second longitudinal end. The first longitudinal end and the second longitudinal end may each have a longitudinal lip insertable into the frame tube through the frame tube opening.

According to another aspect of the present disclosure, the first formed bracket may further include a first lateral end and an opposing second lateral end disposed between the first longitudinal end and the second longitudinal end. The first lateral end and the second lateral end may each have a lateral tab mountable to the second face of the light plate cover.

In another embodiment, each longitudinal lip may have a longitudinal tab insertable into the frame tube through the frame tube opening.

In another embodiment of the present disclosure, the first key bracket may include a first key arm insertable into a first key bracket notch proximate the first lateral end of the formed bracket.

In another embodiment, the second key bracket may include a second key arm insertable into a second key bracket notch proximate the second lateral end of the first formed bracket. The first key bracket and the second key bracket may each include a fastener mount with a fastener opening to mount the first key bracket and the second key bracket to the first formed bracket.

According to another aspect of the present disclosure, the vehicular push bumper light assembly may further include a second light plate assembly having a third light element disposable through a third light plate cover opening and a fourth light element disposable through a fourth light plate cover opening on the light plate cover. In one embodiment, the second light plate assembly may further include a second formed bracket having a third formed bracket opening that may be disposably aligned with the third light plate cover opening and a fourth formed bracket opening disposably aligned with the fourth light plate cover opening. The light plate assembly may further include a third key bracket proximate the third light element and coupled with the second formed bracket in order to secure the third light element through the third formed bracket opening and a third light plate cover opening. In another embodiment, a fourth key bracket proximate the fourth light element may be coupled with the second formed bracket in order to secure the fourth light element through the fourth formed bracket opening and the fourth light plate cover opening.

Pointing to another aspect of the present disclosure, the second formed bracket may include a first longitudinal end and an opposing second longitudinal end. The first longitudinal end and the second longitudinal end may each have a longitudinal lip insertable into the frame tube through the frame tube opening.

In another embodiment, the second formed bracket may further include a first lateral end and an opposing second lateral end disposed between the first longitudinal end and the second longitudinal end. The first lateral end and the second lateral end may each have a lateral tab mountable to the second face of the light plate cover.

In yet a further embodiment of the present disclosure, each longitudinal lip has a longitudinal tab insertable into the frame tube through the frame tube opening.

According to another aspect of the present disclosure, the third key bracket may include a third key arm insertable into a third bracket notch proximate the first lateral end of the second formed bracket in order to secure the third key bracket to the second formed bracket. The fourth key bracket may include a fourth key arm insertable into a fourth key bracket notch proximate the second lateral end of the second formed bracket in order to secure the fourth key bracket to the second formed bracket.

In yet a further embodiment, the third key bracket and the fourth key bracket may each include a fastener mount with a fastener opening to mount the third key bracket and the fourth key bracket to the second formed bracket.

BRIEF DESCRIPTION OF THE DRAWINGS

These and other features and advantages of the various vehicular push bumper light assembly embodiment disclosed herein will be better understood with respect to the following description and drawings, in which the reference numeral may refer to similar or identical elements throughout the description of the figures, and in which.

DETAILED DESCRIPTION

Hereinafter, embodiments of a vehicular push bumper light assembly are described with reference to the accompanying drawings.

This description may use the phrases "in one embodiment," "in embodiments," "in some embodiments," or "in other embodiments," which may each refer to ne or more of the same or different embodiments in accordance with the present disclosure.

It is to be understood that the terminology used herein is for the purpose of describing particular embodiments only, and is not intended to be limiting. As it is used in this description, the term "vehicle" generally refers to land-based motor vehicles having a front bumper.

Various embodiments of the present disclosure provide a vehicular push bumper light assembly for illuminating the area in front of a vehicle. Embodiments of the presently disclosed vehicular push bumper light assembly may be affixed to the front of a vehicle. Elements of the presently-disclosed vehicular push bumper light assembly may be powered by a disposable or rechargeable battery or by the vehicle itself.

As it is used in this description, "light element" generally refers to all illumination sources, such as for example, photo-luminescent sources, fluorescent sources, phosphorescence sources, lasers, electro-luminescent sources, such as electro-luminescent lamps, and light-emitting diodes. As it is used in this description, "light-emitting diode" generally refers to any system that is capable of receiving an electrical signal and producing a color of light in response to the signal. Thus, "light-emitting diode," as used herein, includes light-emitting diodes (LEDs) of all types, including white LEDs, infrared LEDs, ultraviolet LEDs, visible color LEDs, light-emitting polymers, semiconductor dies that produce light in response to current, organic LEDs, electro-luminescent strips, silicon based structures that emit light, and other such systems.

As it is used in this description, "transmission line" generally refers to any transmission medium that can be used for the propagation of signals from one point to another. A transmission line may be, for example, a wire, two or more conductors separated by an insulating medium, a fiber optic line and/or fiber optic bundles.

As used herein, the term "battery" generally refers to any electrical storage device, e.g., vehicle battery, disposable battery, rechargeable battery, battery pack, etc.

Figures 1, 2:
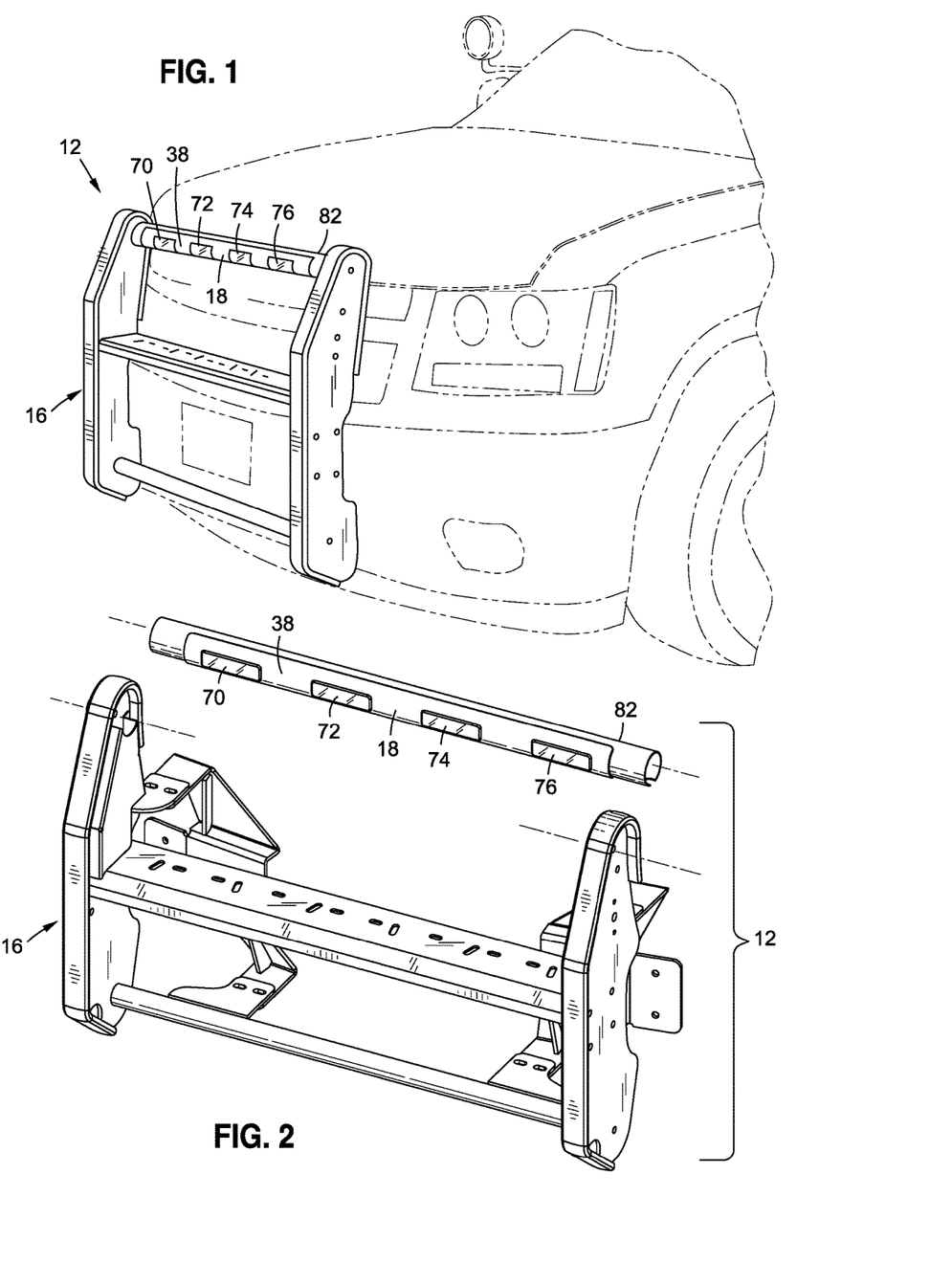
FIG. 1 is a perspective view of the vehicular push bumper light assembly illustrating the frame tube coupled to the H-frame, a first light element, second light element, third light element, and fourth light element disposed through the light plate cover, in accordance with an embodiment of the present disclosure.
FIG. 2 is a perspective view of the vehicular push bumper light assembly with the frame tube removed from the H-frame, in accordance with an embodiment of the present disclosure.

The presently disclosed vehicular push bumper light assembly is referred to generally in FIG. 2 by the reference numeral 12 and is intended to provide a combined vehicle push bumper and lighting system for the front of a vehicle, such as those used by law enforcement. The vehicular push bumper light assembly 12 is designed to be mounted to the front chassis of the vehicle and located typically on or anterior to the front bumper and/or grille. The vehicular push bumper light assembly 12 is typically oriented such that the lights are facing forward to illuminate the area in front of the vehicle. It is to be understood that the vehicular push bumper light assembly 12 may be mounted to and used by various types of vehicles and should not be construed to be limited to only police cars but may also be installed on SUV's or pick-up trucks. Those skilled in the art will recognize that the size and shape of the vehicular push bumper light assembly 12 may vary according to vehicle type, model, manufacturer, style, etc.

In the embodiments depicted in FIGS. 1-2, the vehicular push bumper light assembly 12 includes an H-frame 16, a frame tube 82 coupled to the H-frame 16, a light plate cover 18 affixed over the frame tube 82, and a first light element 70, second light element 72, third light element 74, and fourth light element 76 disposed through the light plate cover 18. The H-frame 16 may be a fully welded, one-piece component of the vehicular push bumper light assembly 12. The H-frame 16 and the frame tube 82 may be formed from metal or other materials with suitable characteristics, including but not limited to strength and precision cutting. FIG. 2 also illustrates the cutting of reliefs 106 into both ends of the frame tube 82 as well as where the frame tube 82 is inserted into the H-frame 16 to allow the passage of a transmission line for the electrical coupling of the light elements (70, 72, 74, 76) to either the vehicle battery or a separate stand-alone battery.

Figure 3:
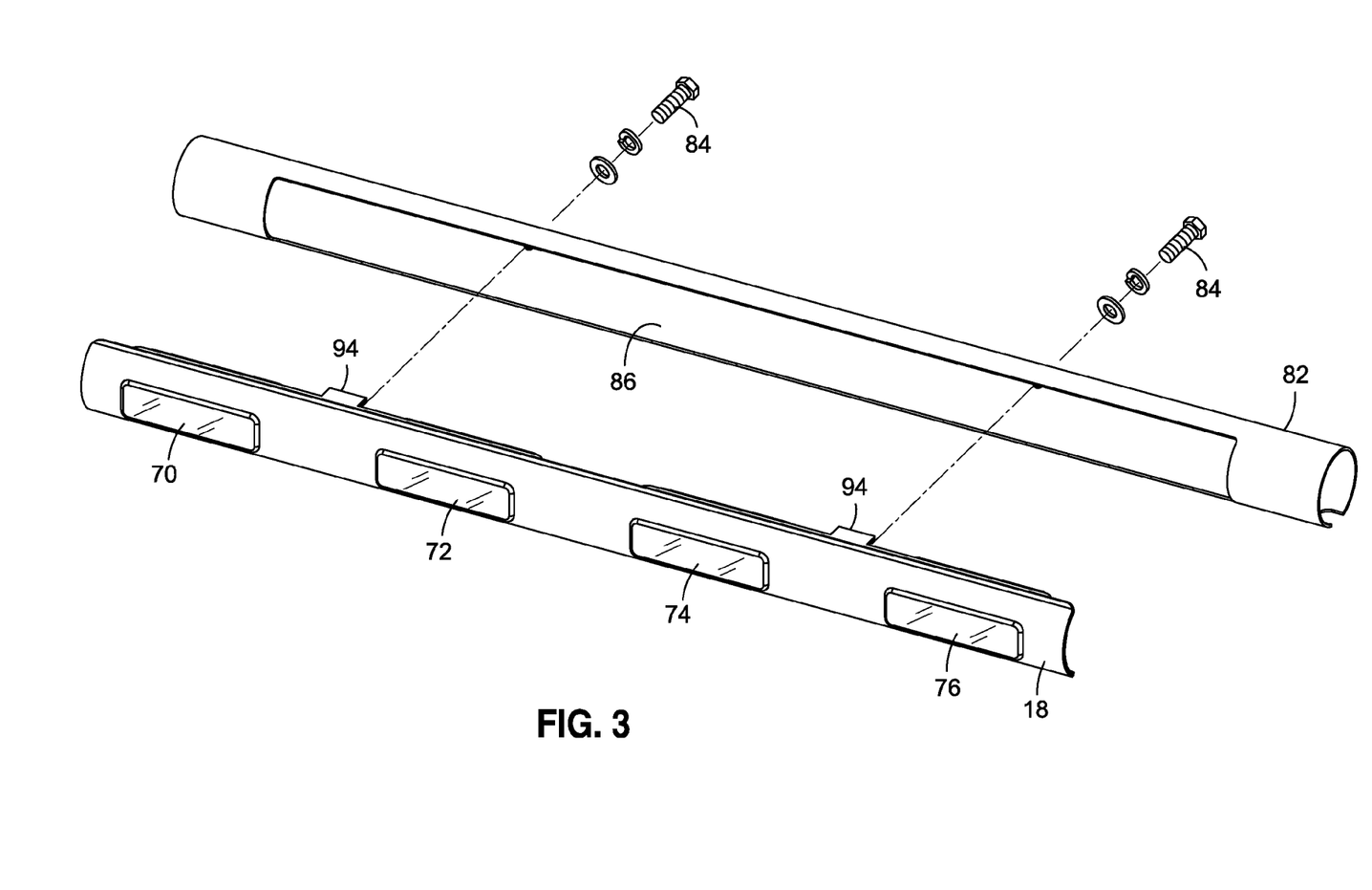
FIG. 3 is a perspective view of the light plate cover including the first light element, second light element, third light element, and fourth light element removed from the frame tube opening found in the frame tube, in accordance with an embodiment of the present disclosure.

The embodiment depicted in FIG. 3 illustrates the light plate cover 18 disposed over a frame tube opening 86 in the frame tube 82. The light plate cover 18 is laser-cut in accordance with the quantity and shape of the light elements desired. The embodiment in FIG. 3 illustrates a light plate cover 18 having a first light plate cover opening 22, a second light plate cover opening 24, a third light plate cover opening 26, and a fourth light plate cover opening 28, all of which have a uniform rectangular size in order to fit the four rectangular light elements 70, 72, 74, and 76. However, it is to be understood that the light plate cover 18 may be laser-cut such that the light plate cover openings are fewer than four and/or have a variety of sizes and shapes. Those skilled in the art will recognize that the quantity, size and shape of the light plate cover openings in the light plate cover 18 may vary according to the quantity, size and shape of the light elements desired for the vehicular push bumper light assembly 12.

Figure 6:
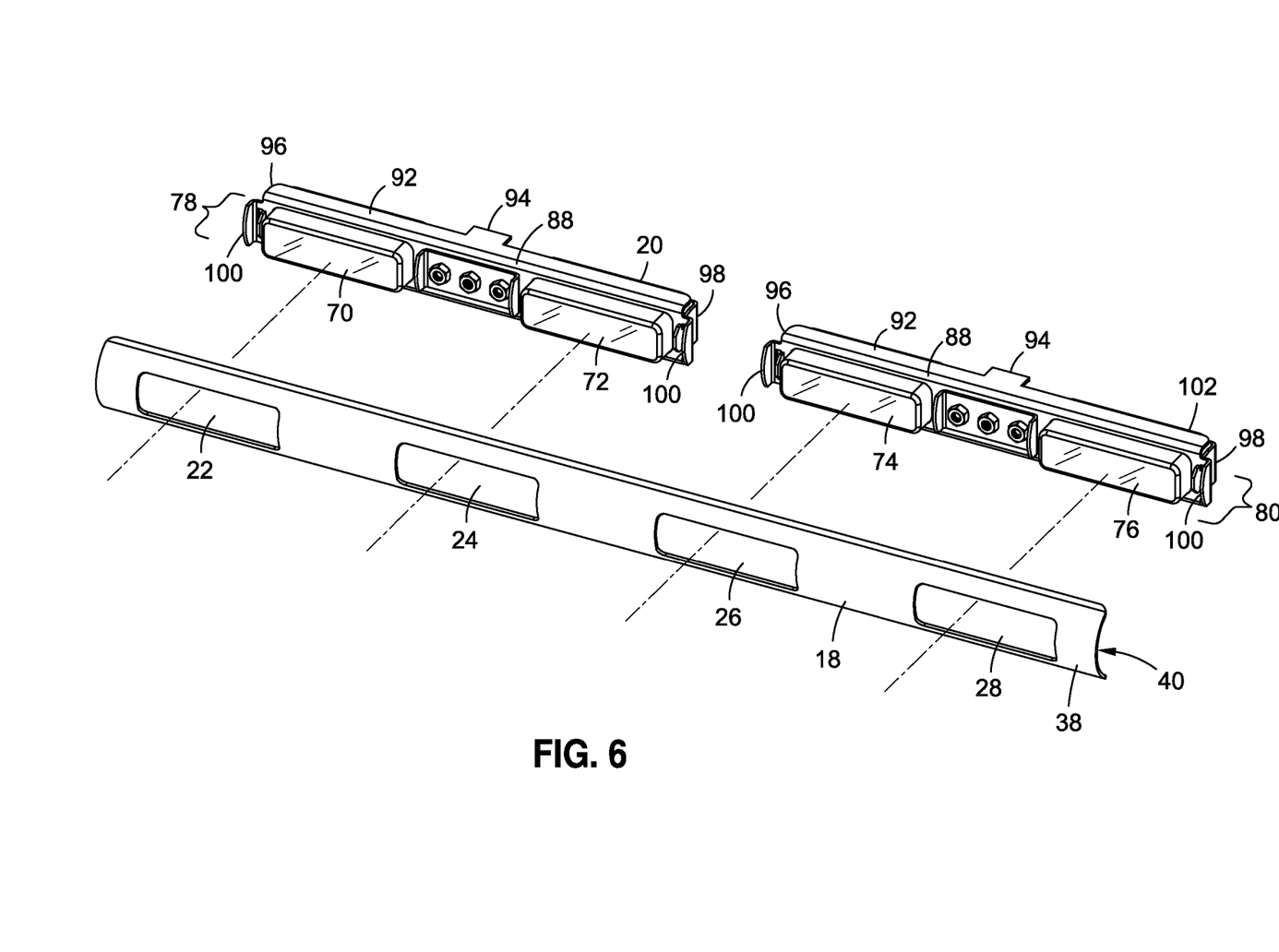
FIG. 6 is a perspective view of a first light plate assembly and a second light plate assembly having first, second, third, and fourth light elements disposable through the openings of the light plate cover, in accordance with an embodiment of the present disclosure.

In FIG. 6, an embodiment is shown of a first light plate assembly 78 having a first light element 70 and a second light element 72. The first light element 70 is shown disposable through the first light plate cover opening 22 of the light plate cover 18. The second light element 72 is shown disposable through the second light plate cover opening 24 of the light plate cover 18. In the embodiment depicted in FIG. 6, the first light element 70 and the second light element 72 are disposed in a direction from the second face 40 to the first face 38 of the light plate cover 18.

The vehicular push bumper light assembly 12 illustrated by the embodiments shown in FIGS. 1-3, and 6 has two light plate assemblies, namely a first light plate assembly 78 and a second light plate assembly 80 which collectively enable the use of up to four light elements (70, 72, 74. 76) to illuminate the area in front of a vehicle. In one embodiment of the vehicular push bumper light assembly 12, the first light element 70, second light element 72, third light element 74, and fourth light element 76 may be a light-emitting diode (LED). Other embodiments of the vehicular push bumper light assembly 12 may only include a single light plate assembly 78 with only two light elements available to illuminate the area in front of the vehicle.

The installation and use of two light plate assemblies 78, 80, as illustratively depicted in FIGS. 1-3 allow the increased illumination of the forward-facing area immediately in front of the push bumper of a vehicle such as a police car, especially in reduced light conditions. This facilitates the inspection by law enforcement officers of objects moving in front of them, assists the determination of whether and how they should use a push bumper under certain circumstances, and signals to other vehicles their presence and the emergent nature of their movements at high speed in an effort to avoid unintended collisions.

Figure 4:
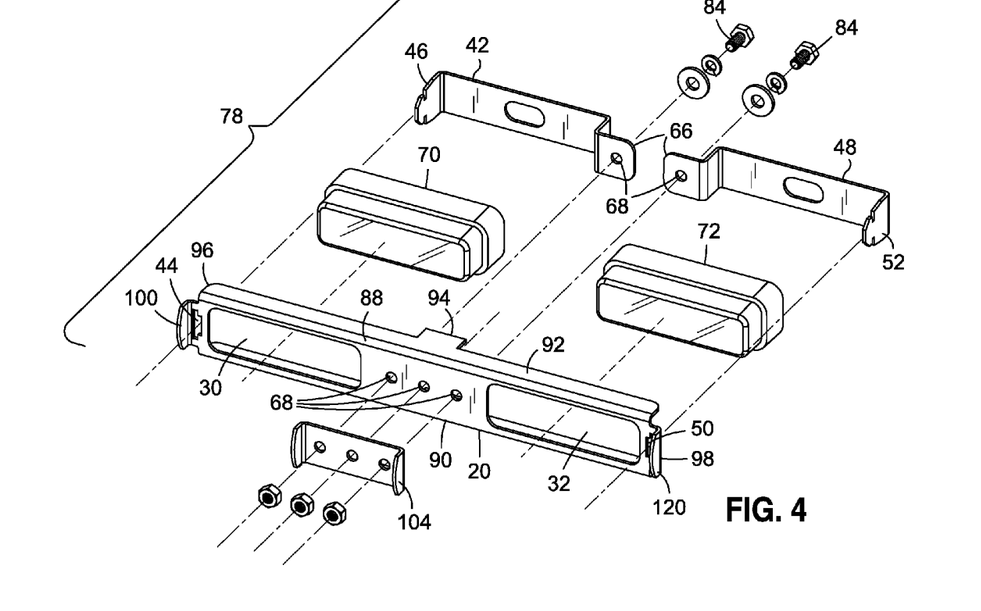
FIG. 4 is a perspective view of a light plate assembly having a first formed bracket with a first formed bracket opening and a second formed bracket opening, and a first light element and a second light element secured by a first keyed bracket and a second keyed bracket, in accordance with an embodiment of the present disclosure.

The embodiment in FIG. 4 illustrates in greater detail a light plate assembly 78 including a first formed bracket 20 with a first formed bracket opening 30 and a second formed bracket opening 32. A first key bracket 42 is used to secure the first light element 70 through the first formed bracket opening 30 by being coupled to the first formed bracket 20. As shown in the embodiment in FIGS. 4 and 6, the first formed bracket opening 30 is approximately aligned with the first light plate cover opening 22 when the first light element 70 is disposed therein. Likewise, a second key bracket 48 may be used to secure the second light element 72 through the second formed bracket opening 32. The second formed bracket opening 32 is approximately aligned with the second light plate cover opening 24 when the second light element 72 is disposed therein. Because the light plate cover 18 may be laser-cut such that the light plate cover openings may vary in size and/or shape, the corresponding formed bracket openings (30, 32, 34, 36) in the formed bracket 20 are likewise precision cut to securely fit the size and shape of the desired light element(s) (70, 72, 74, 76). The ability of the vehicular push bumper light assembly 12 to be customized by quantity, size, and shape of desired light elements 70, 72, 74, 76, 78, could satisfy the compliance requirements that may apply to various law enforcement agencies at the city, county, state, and federal level for warning signal lighting on the push bumpers of police vehicles.

In some embodiments, as shown for example in FIGS. 3-4, the first formed bracket 20 includes a first longitudinal end 88 and an opposing second longitudinal end 90. The first longitudinal end 88 and the second longitudinal end 90 may each have a longitudinal lip 92 insertable into the frame tube 82 through the frame tube opening 86. In another embodiment, each longitudinal lip 92 may have a longitudinal tab 94 also insertable through the frame tube opening 86. The longitudinal tab 94 is designed to prevent damage to the vehicular push bumper light assembly 12, once the light plate cover 18 has been disposed over the frame tube opening 86, so as not to unduly press the first light plate assembly 78 and the second light plate assembly against the interior of the frame tube 82.

According to another embodiment, as shown in FIG. 4, the first formed bracket 20 may further include a first lateral end 96 and an opposing second lateral end 98 disposed between the first longitudinal end 88 and the second longitudinal end 90. The first lateral end 96 and the second lateral end 98 each have a lateral tab 100 that may be mounted to the light plate cover 18. This mounting may be accomplished by, for example, welding each lateral tab 100 to the second face 40 of the light plate cover 18 once the formed bracket openings (30, 32, 34, 36) and the light plate cover openings (22, 24, 26, 28) have been positionally aligned.

As shown in FIG. 4, in one embodiment the first key bracket 42 includes a first key arm 46 that can be inserted into a first key bracket notch 44 that is proximate to the first lateral end 96 of the first formed bracket 20. In another embodiment, the second key bracket 48 includes a second key arm 52 that may be inserted into a second key bracket notch 50 that is proximate to the second lateral end 98 of the first formed bracket 20. In another embodiment, the first key bracket 42 and the second key bracket 48 may also be mounted to the first formed bracket 20 through a fastener mount 66 with a fastener opening 68. In FIG. 4 for example, a screw or bolt and washer 84 may be inserted through the fastener openings 68 on the fastener mounts 66 of the first key bracket 42 and the second key bracket 48 and then further inserted through additional fastener openings 68 on the first formed bracket 20. The screw or bolt 84 may be further inserted through a bracket plate 104 and a threaded nut to securely couple the first key bracket 42 and the second key bracket 48 to the first formed bracket 20 and to positionally align the various light elements with their corresponding formed bracket openings. For example, the first key bracket 42 may press and secure the first light element 70 through the first formed bracket opening 30 to a position where the perimeter (or diameter) of the first light element 70 is the same as the perimeter (or diameter) of the first formed bracket opening 30. The insertion of the bolt 84 through the fastener openings 68 on the first formed bracket 20 enable the first key bracket 42 to tightly secure the first light element 70 in the first formed bracket opening 30.

Figure 5:
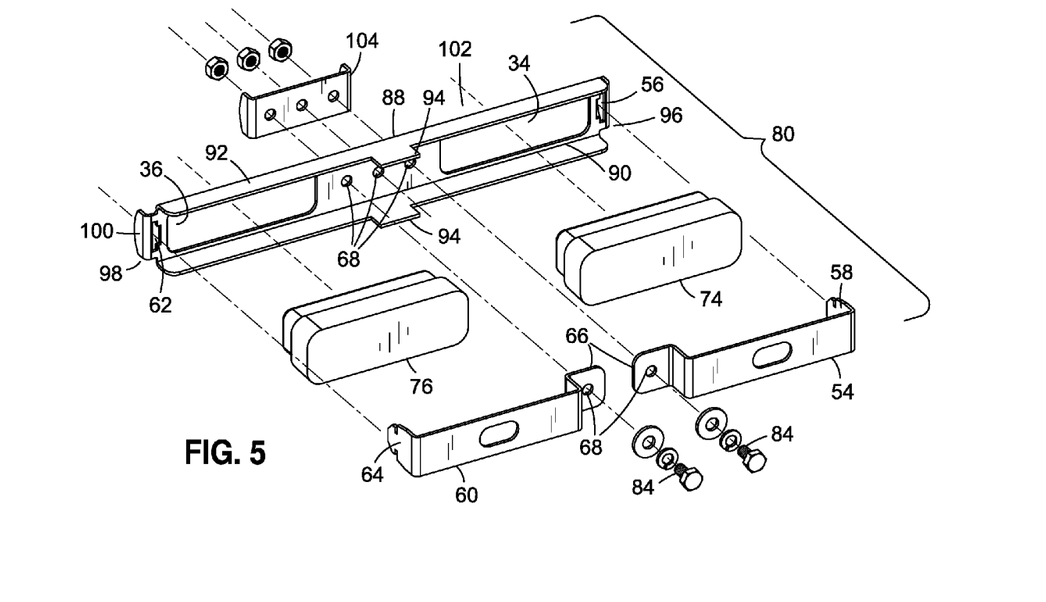
FIG. 5 is a perspective view of a light plate assembly having a second formed bracket with a third formed bracket opening and a fourth formed bracket opening, and a third light element and a fourth light element secured by a third keyed bracket and a fourth keyed bracket, in accordance with an embodiment of the present disclosure.
Figures 7, 8:
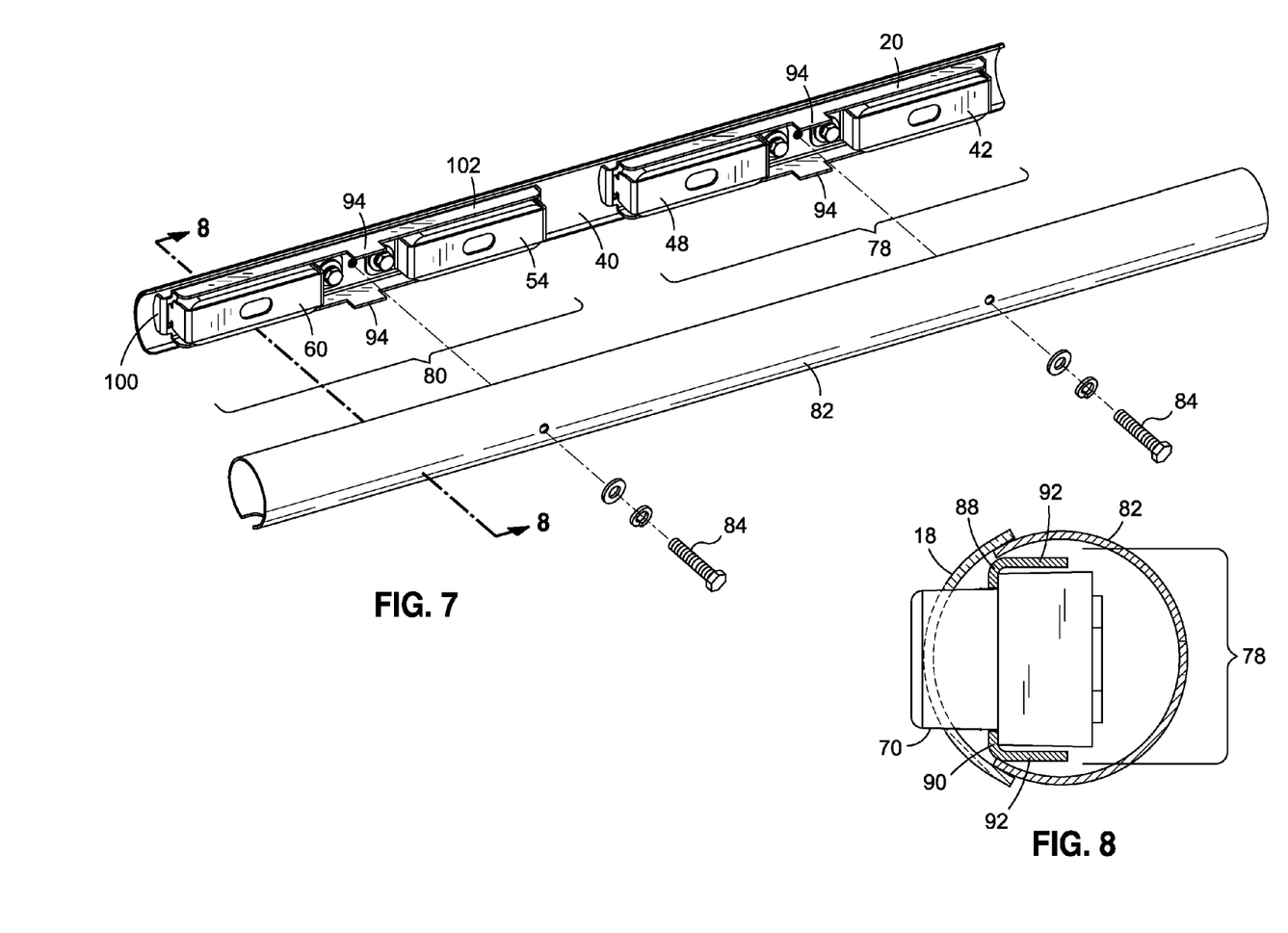
FIG. 7 is a rear view of the first light plate assembly and second light plate assembly coupled to the light plate cover and the frame tube coupled to the first formed bracket and the second formed bracket, in accordance with an embodiment of the present disclosure.
FIG. 8 is a side view of the first light plate assembly coupled to the light plate cover and the frame tube, with a first light element disposed through a first light plate cover opening.

In another embodiment, as shown in FIG. 7, a screw or bolt and washer 84 may be inserted through a fastener opening 68 on the back of the frame tube 82. The bolt 84 may then be further inserted through an additional central fastener opening 68 on the first formed bracket 20, located between the first formed bracket opening 30 and the second formed bracket opening 32. As shown in FIGS. 5 and 6, the screw or bolt 84 may be further inserted through a bracket plate 104 and a threaded nut to securely couple the frame tube 82 to the first formed bracket 20 and to positionally align the first formed bracket 20 within the frame tube 82. FIG. 8 illustrates from a side view an embodiment of the vehicle push bumper light assembly 12 with the first light plate assembly 78 coupled to the light plate cover 18. The longitudinal lip 92 of the first formed bracket 20 is shown inserted into the frame tube 82, with a first light element 70 securely fitted through the first light plate cover opening 22.

In some embodiments, the vehicular push bumper light assembly 12 has a second light plate assembly 80 to project more light in front of the vehicle. FIG. 6 depicts the second light plate assembly 80 as having a third light element 74 that may be disposed through the third light plate cover opening 26 and a fourth light element 76 that may be disposed through a fourth light plate cover opening 28 on the light plate cover 18. The embodiment in FIG. 5 illustrates in greater detail the second light plate assembly 80 including a second formed bracket 102 with a third formed bracket opening 34 and a fourth formed bracket opening 36. A third key bracket 54 is used to secure the third light element 74 through the third formed bracket opening 34 by being coupled to the second formed bracket 102. As shown in the embodiment in FIGS. 4 and 6, the third formed bracket opening 34 is approximately aligned with the third light plate cover opening 28 when the third light element 74 is disposed therein. Likewise, a fourth key bracket 60 may be used to secure the fourth light element 76 through the fourth formed bracket opening 36. The fourth formed bracket opening 36 is approximately aligned with the fourth light plate cover opening 28 when the fourth light element 76 is disposed therein.

In the embodiment shown in FIGS. 3 and 5, the second formed bracket 102 includes a first longitudinal end 88 and an opposing second longitudinal end 90. The first longitudinal end 88 and the second longitudinal end 90 may each have a longitudinal lip 92 insertable into the frame tube 82 through the frame tube opening 86. In another embodiment, each longitudinal lip 92 may have a longitudinal tab 94 also insertable through the frame tube opening 86.

According to some embodiments, for example as shown in FIG. 5, the second formed bracket 102 may further include a first lateral end 96 and an opposing second lateral end 98 disposed between the first longitudinal end 88 and the second longitudinal end 90. The first lateral end 96 and the second lateral end 98 each have a lateral tab 100 that may be mounted to the second face 40 of the light plate cover 18, such as by welding.

According to the embodiment shown in FIG. 5, the third key bracket 54 includes a third key arm 58 that can be inserted into a third key bracket notch 56 that is proximate to the first lateral end 96 of the second formed bracket 102. In another embodiment, the fourth key bracket 60 also includes a fourth key arm 64 that may be inserted into a fourth key bracket notch 62 that is proximate to the second lateral end 98 of the second formed bracket 102. In that embodiment, the third key bracket 54 and the fourth key bracket 60 may each be mounted to the second formed bracket 102 through a fastener mount 66 with a fastener opening 68. In FIG. 5 for example, a screw or bolt and washer 84 may be inserted through the fastener openings 68 on the fastener mounts 66 of the third key bracket 54 and the fourth key bracket 60 and then further inserted through additional fastener openings 68 on the second formed bracket 102. The screw or bolt 84 may then be further through a bracket plate 104 and a threaded nut to securely couple the third key bracket 54 and the fourth key bracket 60 to the second formed bracket 102.

Although embodiments have been described in detail with reference to the accompanying drawings for the purpose of illustration and description, it is to be understood that the disclosed processes and systems are not to be construed as limited thereby. It will be apparent to those of ordinary skill in the art that various modifications to the foregoing embodiments may be made without departing from the scope of the disclosure.

What is claimed is:

1. A vehicular push bumper light assembly mountable to a vehicle, comprising:
   a frame configured to be mounted to a front chassis of the vehicle;
   a frame tube coupled to the frame, the frame tube having an elongated opening facing a front of the vehicle; and
   a light plate assembly located in the elongated opening and attached to the frame tube, the light plate assembly including:
      a plate cover including at least a first opening and a second opening;
      at least two light elements, one of the at least two light elements located in each of the first plate cover opening and second plate cover opening; and
      a bracket attached to the plate cover having at least two bracket openings, a first bracket opening being aligned with the first plate cover opening and a second bracket opening aligned with the second plate cover opening.

2. The vehicular push bumper light assembly of claim 1, wherein the bracket includes a first longitudinal end and an opposing second longitudinal end, the first longitudinal end and the second longitudinal end each having a longitudinal lip insertable into the frame tube through the elongated opening.

3. The vehicular push bumper light assembly of claim 1, wherein the first bracket further includes a first lateral end and an opposing second lateral end disposed between the first longitudinal end and the second longitudinal end, the first lateral end and the second lateral end each having a lateral tab mountable to the light plate cover.

4. The vehicular push bumper light assembly of claim 2, wherein each longitudinal lip has a longitudinal tab insertable into the frame tube through the elongated opening.

5. The vehicular push bumper light assembly of claim 1, the bracket further including at least two rear mounting frames including a first end and a second end.

6. The vehicular push bumper light assembly of claim 5, wherein one of the at least two rear mounting frames surround one of the at least two light elements on three sides.

7. The vehicular push bumper light assembly of claim 5, wherein the at least two rear mounting frames attach to the bracket by a combination of one keyed interlocking connection with the bracket and one mechanical fastener on each of the first end and the second end.

8. The vehicular push bumper light assembly of claim 5, the bracket including at least one opening for connecting the bracket to the frame tube using at least one mechanical fastener.

9. The vehicular push bumper light assembly of claim 1, wherein the frame tube is coupled to the frame by cylindrical mounting bases formed on the frame.

10. The vehicular push bumper light assembly of claim 9, wherein the cylindrical mounting bases define an interior diameter which is substantially equal to an outer diameter of the frame tube.

11. A method for forming a vehicular push bumper light assembly mountable to a vehicle, comprising:
forming a frame configured to be mounted to a front chassis of the vehicle;
forming a light plate assembly, including:
 forming a plate cover including at least a first opening and a second opening;
 forming a bracket mountable to the plate cover having at least a first bracket opening and a second bracket opening, the first bracket opening being aligned with the first plate cover opening and the second bracket opening aligned with the second plate cover opening;
 forming at least two light elements, one of the at least two light elements located in each of the first plate cover opening and second plate cover opening;
forming a frame tube including an elongated opening configured to accept the light plate assembly;
mounting the light plate assembly in the frame tube by passing a portion of the light plate assembly through the elongated opening; and
coupling the frame tube to the frame.

12. The method of claim 11, wherein the frame tube is coupled to the frame by cylindrical mounting bases formed on the frame.

13. The method of claim 12, wherein the cylindrical mounting bases define an interior diameter which is substantially equal to an outer diameter of the frame tube.

14. The method of claim 11, wherein the light plate assembly is mounted to the frame tube by a mechanical fastener.

15. The method of claim 11, further comprising the step of mounting at least two rear mounting frames including a first end and a second end to the bracket.

16. The method of claim 15, wherein one of the at least two rear mounting frames surround one of the at least two light elements on three sides.

17. The method of claim 15, wherein the at least two rear mounting frames attach to the bracket by a combination of one keyed interlocking connection with the bracket and one mechanical fastener on each of the first end and the second end.

18. The method of claim 11, wherein when the light plate assembly is inserted in the frame tube through the elongated opening, the light assembly is centered in the opening by a plurality of tabs.

* * * * *